B. DARROW.
VEHICLE WHEEL RIM.
APPLICATION FILED FEB. 12, 1914.
1,127,412.
Patented Feb. 9, 1915.
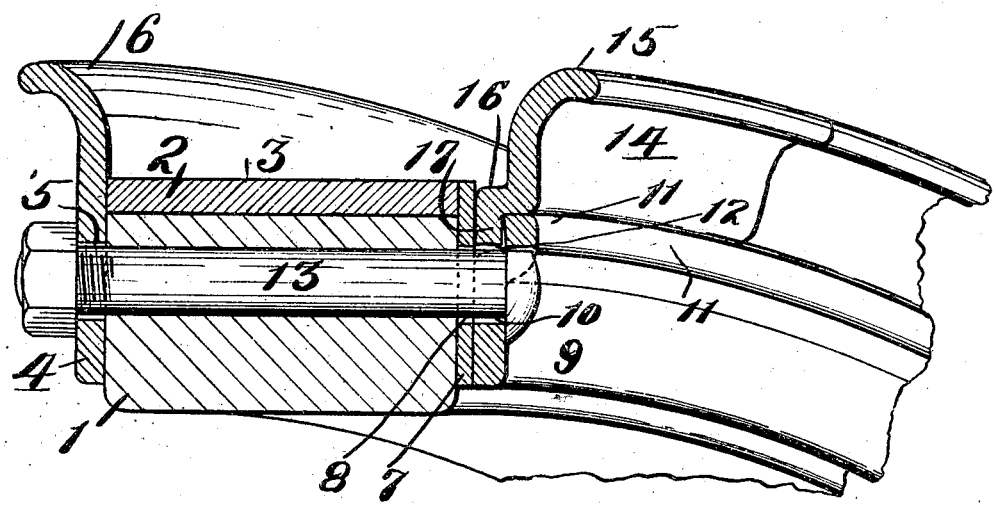
Witnesses
Jas. L. Bitter.
A. L. McClintock
Inventor
BURGESS DARROW
By C. E. Humphrey.
Attorney

UNITED STATES PATENT OFFICE.

BURGESS DARROW, OF AKRON, OHIO, ASSIGNOR TO THE GOODYEAR TIRE AND RUBBER COMPANY, OF AKRON, OHIO, A CORPORATION OF OHIO.

VEHICLE WHEEL-RIM.

1,127,412.  Specification of Letters Patent. Patented Feb. 9, 1915.

Application filed February 12, 1914. Serial No. 818,249.

*To all whom it may concern:*

Be it known that I, BURGESS DARROW, a citizen of the United States, residing at Akron, in the county of Summit and State of Ohio, have invented new and useful Improvements in Vehicle Wheel-Rims, of which the following is a specification.

This invention relates to vehicle wheel rims used for holding elastic tires thereon.

Briefly, as a result of an effort made to standardize wheels for motor vehicles, a standard wheel embodying a felly and a felly-band are now produced by the wheel manufacture and these wheels are made to conform to different standard measurements, and the object of the invention is to utilize a portion of this standard equipment, to-wit:—the felly-band, as a portion of the tire-carrying rim, and to supplement this with devices for detachably holding an elastic tire thereon.

By utilizing the felly-band as a portion of the tire-carrying rim, the additional weight of a supplemental rim as now constructed, is obviated.

With the foregoing and other objects in view, the invention consists in the novel construction, combination and arrangement of parts constituting the invention to be hereinafter specifically described and illustrated in the accompanying drawing which forms a part hereof wherein is shown the preferred embodiment of the invention, but it is to be understood that changes, variations and modifications can be resorted to which come within the scope of the matter hereinafter claimed.

In the drawing, the view presented shows the rim portion of a vehicle wheel and the tire-holding accessories partially in section and partially in perspective.

Referring to the drawing, the reference numeral 1 denotes a felly on which is a felly-band 2, the outer face 3 of which constitutes a seat for a tire. Applied to one face of the felly 1 is a ring 4 provided with circumferentially-extending series of transverse openings 5. The outer edge 6 of the ring 4 project outwardly beyond the face 3 of the band 2 and is fashioned to constitute a tire-holding member. Applied to the opposite face of the felly is an annular ring 7 provided with a longitudinally-extending series of openings 8. Arranged in lapping engagement with the member 7 is a ring 9 provided with a circumferentially-extending series of openings 10 adapted to register with the openings 8 in the member 7 and the openings 5 in the member 4. The outer portion of the ring 9 is offset laterally so that the outer edge 11 of the member 9 is separated from the felly-band to provide between them a circumferentially-extending channel 12. In order to hold members 4, 7 and 9 in assembled relation, bolts 13 are passed through the registering openings in these members and through suitable openings formed in the felly. Adapted to be mounted in the channel 12 is a tire-retaining ring 14, the outer portion 15 of which is fashioned to engage and hold a tire in position on the seat 3. Inwardly of the portion 15 the ring is provided with a shoulder 16 which is flush or slightly inwardly of the seat 3 of the band 2. From this extends an inwardly-projecting portion 17 adapted to seat in the channel 12. By this construction, in order to seat a tire on or dismount it from a rim embodying this invention, the tire-holding member 14 is removed and the tire slipped laterally onto the seat 3, after which the ring is sprung to position in the usual manner.

I claim:—

A vehicle wheel embodying a felly-band the outer face of which constitutes a tire seat, a tire-holding element arranged along one side of said band and projecting outwardly therefrom, an annular radially-extending ring applied on the opposite side of said band with the outer edge thereof approximately flush with the outer face of the band and with the remaining portion of the ring extending inwardly therefrom, a second annular ring having a lateral offset at its outer portion spaced from said first ring to provide a circumferential channel, said offset portion terminating inwardly from the outer face of the felly-band, and a split annular tire-retaining element adapted to be sprung over the lateral offset portion of the second ring and seat in said channel and provided with an outwardly-projecting portion for engaging the side of a tire, and means extending through said rings for holding them securely in position.

In testimony whereof I have hereunto set my hand in presence of two subscribing witnesses.

BURGESS DARROW.

Witnesses:
R. M. LEIMERY,
A. J. GILHOOHY.